United States Patent
Shu et al.

(10) Patent No.: US 6,551,029 B2
(45) Date of Patent: Apr. 22, 2003

(54) ACTIVE APPARATUS AND METHOD FOR REDUCING FLUID INDUCED STRESSES BY INTRODUCTION OF ENERGETIC FLOW INTO BOUNDARY LAYER AROUND AN ELEMENT

(76) Inventors: Hongbo Shu, 19619 Ember Sky Ct., Houston, TX (US) 77094; Donald Wayne Allen, 4323 Lake Kemp Ct., Richmond, TX (US) 77469

( * ) Notice: Subject to any disclaimer, the term of this patent is extended or adjusted under 35 U.S.C. 154(b) by 0 days.

(21) Appl. No.: 09/773,767

(22) Filed: Jan. 31, 2001

(65) Prior Publication Data

US 2002/0046841 A1 Apr. 25, 2002

Related U.S. Application Data

(60) Provisional application No. 60/179,222, filed on Jan. 31, 2000.

(51) Int. Cl.$^7$ .............................. B63B 1/34; E21B 17/01
(52) U.S. Cl. ................. 405/211; 405/195.1; 405/224.2; 166/359; 166/367; 114/243; 114/264; 114/67 A; 114/67 R
(58) Field of Search ................. 166/350, 355, 166/367, 359; 405/195.1, 204, 205, 211, 223.1, 224, 224.2; 114/56.1, 67 A, 67 R, 243, 264, 265

(56) References Cited

U.S. PATENT DOCUMENTS

| | | | | |
|---|---|---|---|---|
| 2,663,276 A | * | 12/1953 | Ouellet | 114/67 A |
| 2,998,790 A | * | 9/1961 | Mason | 114/264 X |
| 3,717,113 A | * | 2/1973 | Wilde | 114/264 |
| 4,078,605 A | * | 3/1978 | Jones | 166/359 |
| 4,286,434 A | * | 9/1981 | Moisdon | 60/641.7 |
| 4,656,959 A | * | 4/1987 | Moisdon | 114/56.1 |
| 5,875,728 A | * | 3/1999 | Ayers et al. | 114/264 |
| 5,984,584 A | * | 11/1999 | McMillan et al. | 405/195.1 |
| 6,148,751 A | * | 11/2000 | Brown et al. | 114/67 A |
| 6,196,768 B1 | * | 3/2001 | Allen et al. | 405/224 |
| 6,349,664 B1 | * | 2/2002 | Brown et al. | 114/264 |

FOREIGN PATENT DOCUMENTS

GB 2310832 * 9/1997

* cited by examiner

Primary Examiner—Jong-Suk (James) Lee
(74) Attorney, Agent, or Firm—Gilbreth & Associates, P.C.; J. M. (Mark) Gilbreth; Mary A. Gilbreth (57) ABSTRACT

Discharge of fluid into or suction of fluid from the boundary region around such structures as offshore marine elements and moored marine vessels to reduce fluid current induced stress to marine elements and low frequency oscillations of moored vessels due to waves and wind striking the vessel is disclosed.

11 Claims, 6 Drawing Sheets

ACTIVE APPARATUS AND METHOD FOR REDUCING FLUID INDUCED STRESSES BY INTRODUCTION OF ENERGETIC FLOW INTO BOUNDARY LAYER AROUND AN ELEMENT

RELATED APPLICATION DATA

This application claims priority from U.S. Provisional Application Ser. No. 60/179,222, filed Jan. 31, 2000.

BACKGROUND OF THE INVENTION

1. Field of the Invention

The present invention relates to methods and apparatus of reducing and/or controlling vortex-induced-vibrations ("VIV"), current drag, low frequency drift oscillations due to random waves, and low frequency wind induced resonant oscillations. In another aspect, the present invention relates to methods and apparatus for the active control of vortex-induced-vibrations ("VIV"), current drag, low frequency drift oscillations due to random waves, and low frequency wind induced resonant oscillations. In even another aspect, the present invention relates to methods and apparatus for pumping water thru fluid passages thru marine members or vessels for reducing and/or controlling VIV, current drag, low frequency drift oscillations due to random waves, and low frequency wind induced resonant oscillations.

2. Description of the Related Art

When drilling for and/or producing hydrocarbons or the like from subterranean deposits which lie under a body of water, it is necessary to provide a marine riser system for establishing fluid communication between the surface and the marine bottom. The principal purpose of the riser is to provide a fluid flow path between a drilling vessel involved in oil and gas operations and a well bore and to guide a drill string to the well bore. The vessel may be such a structure as a spar or other floating drilling or production platform. A vessel may also be a buoyant ship. These vessels usually will be moored with lines to prevent substantial movement of the vessel from a desired location.

A typical marine riser system normally consists of one or more fluid-conducting conduits which extend from the surface to a structure (e.g., wellhead) on the marine bottom. For example, in drilling a submerged well, a drilling riser usually consists of a main conduit through which the drill string is lowered and through which the drilling mud is circulated from the lower end of the drill string back to the surface. In addition to the main conduit, it is conventional to provide auxiliary conduits, e.g., choke and kill lines, etc., which extend parallel to and are carried by the main conduit.

This drilling for and/or producing of hydrocarbons from offshore fields has created many unique engineering challenges. For example, in order to limit the angular deflections of the upper and lower ends of the riser pipe and to provide required resistance to lateral forces, it is common practice to use apparatus for adding axial tension to the riser pipe string. Further complexities are added when the drilling structure is a floating vessel, as the tensioning apparatus must accommodate considerable heave due to wave action. Still further, the lateral forces due to current drag require some means for resisting them whether the drilling structure is a floating vessel or a platform fixed to the subsurface level.

The magnitude of the stresses on the riser pipe are generally a function of and increase with the velocity of the water current passing the riser pipe, and the length of the riser pipe.

It is noted that even moderate velocity water currents acting on a riser can cause stresses. Such moderate or higher currents are readily encountered when drilling for offshore oil and gas in a marine inlet or near a river mouth.

Drilling in ever deeper water depths requires longer riser pipe strings are subject to greater drag forces which must be resisted by more tension. This is believed to occur as the resistance to lateral forces due to the bending stresses in the riser decreases as the depth of the body of water increases. Accordingly, the adverse effects of drag forces against the riser caused by strong and shifting currents in these deeper waters increase and set up stresses in the riser which can lead to severe fatigue and/or failure of the riser if left unchecked.

There are generally two kinds of water current induced stresses.

The first kind of stress is caused by vortex-induced alternating forces that vibrate the riser ("vortex-induced vibrations" or "VIV") in a direction perpendicular to the direction of the current. When water flows past the riser, vortices are alternately shed from each side of the riser. This produces a fluctuating force on the riser transverse to the current. If the frequency of this harmonic load is near the resonant frequency of the riser, large vibrations transverse to the current can occur. These vibrations can, depending on the stiffness and the strength of the riser and the welds between the riser joint, lead to unacceptably short fatigue lives. In fact, stresses caused by high current conditions have been known to cause risers to break apart and fall to the ocean floor.

The second type of stress is caused by drag forces which push the riser in the direction of the current due to the riser's resistance to fluid flow. The drag forces are amplified by vortex induced vibrations of the riser. A riser pipe that is vibrating due to vortex shedding will disrupt the flow of water around it more than a stationary riser. This results in more energy transfer from the current to the riser, and hence more drag.

Many methods have been developed to reduce vibrations of subsea rises.

Some of these methods to reduce vibrations caused by vortex shedding from subsea risers operate by stabilization of the wake. These methods include streamlined fairings, wake splitters and flags.

Streamlined or teardrop shaped, fairings that swivel around a riser have been developed that almost eliminate the sheading or vortexes. The major drawbacks to teardrop shaped fairings is the cost of the fairing and the time required to install such fairings. Additionally, the critically required rotation of the fairing around the riser is challenged by long-term operation in the undersea environment. A non-rotating fairing subjected to a cross-current may result in vortex shedding that induces greater vibration than the bare riser would incur.

Wake splitters are flat plates that extend from the back of a riser parallel to the current flow direction. These wake splitters have been found to be effective to create a symmetric vortex pattern so that each vortex "sees" an image created by the rigid splitter plate giving symmetry with respect to the axis in the direction of flow. Splitter plates also stabilize the separation points, decrease the wake width and reduce drag. Splitter plates suffer from most of the same detrimental effects as teardrop shaped fairings for off-axis currents. They must therefore either be rotatable or be used only where the directions of a significant current does not vary.

Flags are similar to wake splitters, but are flexible. They are not generally as effective as wake splitters, but have the advantage that they can wrap around a riser and remain somewhat effective with varying current directions without being rotatable. Flags are not commonly used in subsea applications due to the high probability of the flag wrapping itself around the riser and becoming ineffective, and because of the difficulty and expense of attaching the flag to the riser along the length of the riser.

Other of these methods to reduce vibrations caused by vortex shedding from subsea risers operate by modifying the boundary layer of the flow around the riser to prevent the correlation of vortex shedding along the length of the riser. Examples of such methods include the inclusion of helical strakes around the riser, axial rod shrouds and perforated shrouds.

Where possible, it is generally preferred to utilize strakes over fairings, wake splitters and flags.

There exists a need in the art for methods and apparatus of reducing and/or controlling VIV, current drag, low frequency drift oscillations due to random waves, and low frequency wind induced resonant oscillations.

There is another need in the art for methods and apparatus of reducing and/or controlling VIV, current drag, low frequency drift oscillations due to random waves, and low frequency wind induced resonant oscillations that do not suffer from the disadvantages of the prior art.

There is even another need in the art for methods and apparatus that perform actively to reduce and/or control VIV, current drag, low frequency drift oscillations due to random waves, and low frequency wind induced resonant oscillations.

There is still another need in the art for methods and apparatus that actively pump water thru fluid passages passing thru marine members to reduce and/or control VIV, current drag, low frequency drift oscillations due to random waves, and low frequency wind induced resonant oscillations.

SUMMARY OF THE INVENTION

It is an object of the resent invention to provide for methods and apparatus of reducing and/or controlling VIV, current drag, low frequency drift oscillations due to random waves, and low frequency wind induced resonant oscillations.

It is another object of the present invention to provide for methods and apparatus of reducing and/or controlling VIV, current drag, low frequency drift oscillations due to random waves, and low frequency wind induced resonant oscillations that do not suffer from the disadvantages of the prior art.

It is even another object of the present invention to provide for methods and apparatus that perform actively to reduce and/or control VIV, current drag, low frequency drift oscillations due to random waves, and low frequency wind induced resonant oscillations.

It is still another object of the present invention to provide for methods and apparatus that actively pump water thru fluid passages passing thru marine members to reduce and/or control VIV, current drag, low frequency drift oscillations due to random waves, and low frequency wind induced resonant oscillations.

One embodiment of the present invention provides a method for protecting a first member from the effects of a fluid current flowing past the member, defining a fluid boundary layer near the member comprising an upstream region that is upstream with respect to the member and comprising a downstream region that is downstream with respect to the member. The method includes providing a fluid passage extending from the boundary layer to the downstream region. Fluid is then pumped thru the fluid passage to the downstream region.

Another embodiment of the present invention provides for a method for protecting a member from the effects of a current of water flowing past said member, the current defining a fluid boundary layer near the member comprising an upstream region that is upstream of the member and comprising a downstream region that is downstream with respect to the member. The method includes pumping water thru the fluid passage from the fluid boundary layer to the downstream region.

Even another embodiment of the present invention is a method for reducing low frequency oscillations of a moored vessel caused by waves or wind striking the vessel, wherein the vessel has a first side and a second side and a fluid passage extending from the first side to the second side, with a first opening positioned on the first side and a second opening positioned on the second side. The method involves pumping water in from either opening when the vessel moves toward an opening and out of either opening when the vessel moves away from an opening.

Yet another embodiment of the present invention provides for a buoyant vessel involved in oil and gas operations having resistance to low frequency oscillations caused by waves and wind striking the vessel. The vessel has a hull having a first side and a second side with an opening on the first and second sides connected by a fluid passage. A pump is connected to the fluid passage and is suitable for pumping water in from either opening when the vessel moves toward an opening and for pumping water out of either opening when the vessel moves away from an opening.

DETAILED DESCRIPTION OF THE INVENTION

Figure 1:
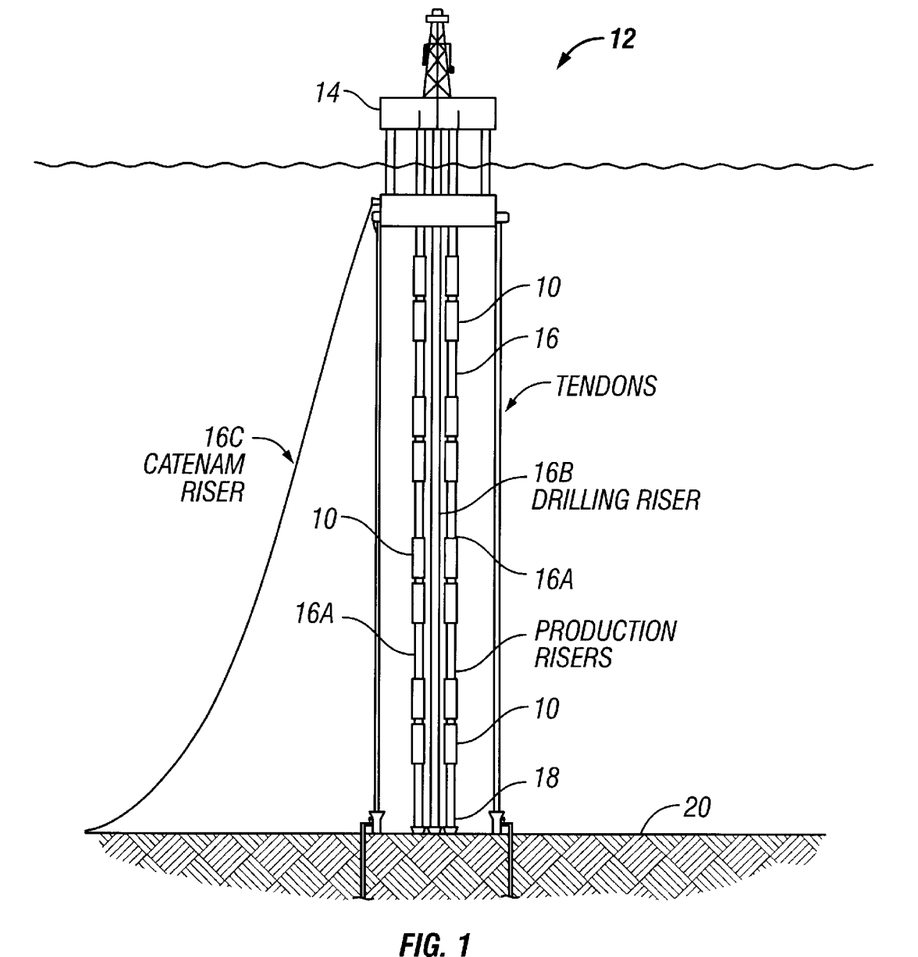
FIG. 1 is an illustration of a typical environment in which system 100 of present invention may be deployed, showing tension leg platform ("TLP") 12, risers 16, such as production risers 16A, drilling risers 16B and catenary risers 16C, surface facilities 14, and the ocean floor 20.

Referring first to FIG. 1, there is illustrated a typical environment in which active system 100 of the present invention may be deployed. An offshore platform 12, shown here a tension leg platform ("TLP"), includes surface facilities 14, risers 16, including production risers 16A, drilling risers 16B, and catenary risers 16C, and wells 18 at ocean floor 20. In some deepwater developments, it would not be uncommon for this to be a half mile or more of water depth. As the production risers are not tied to supporting framework such as the conductor guides in traditional bottom-founded platforms, buoyancy cans or floatation modules may be deployed along the length of the riser to increase its buoyancy, but horizontal or lateral loading from currents on this long, unsupported run is not alleviated by the addition of such buoyant support. Rather, the presence of buoyancy cans or floatation modules around the circumference of the risers materially increase the profile presented to the current and leads to greater drag and VIV effects. As discussed in the background, unabated, VIV can lead to premature failure of equipment. However, system 100 of the present invention is installed along production risers 16 to manage VIV problems.

As explained above, as water flows past the riser, vortices are alternately shed from each side of the riser in a boundary layer region. The idea of the present invention, is to either introduce flow into the boundary layer region by pumping, or to divert flow from the boundary region by suction, thereby reducing drag and vibration.

Figure 2A:
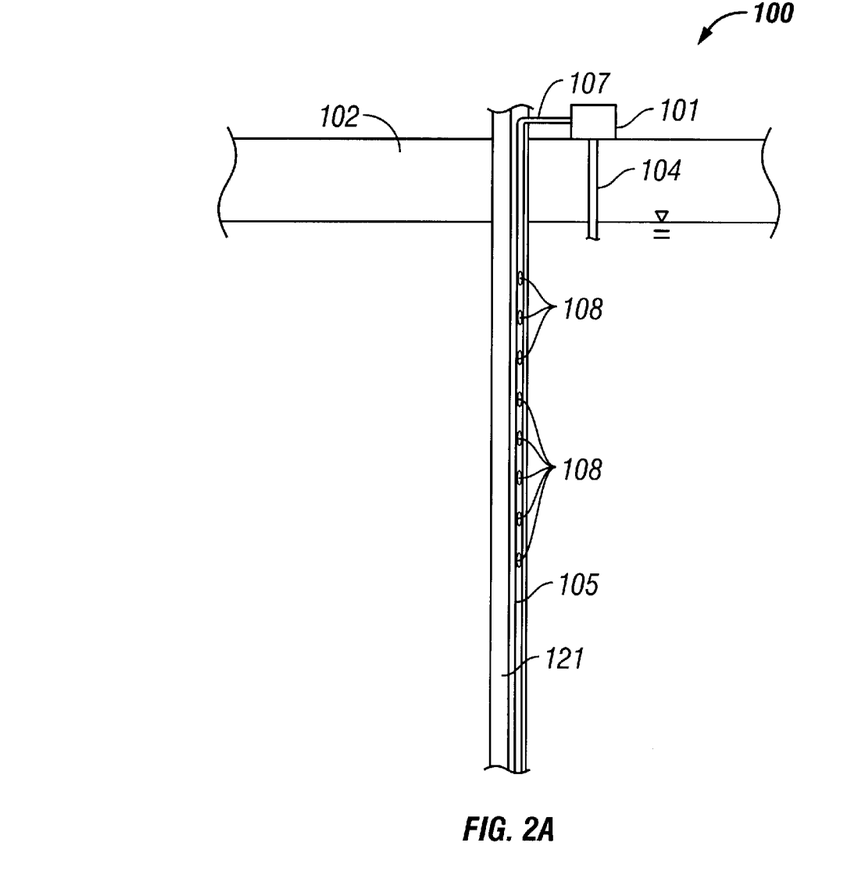
FIG. 2A is a schematic of active apparatus 100 of the present invention, showing deck 102 on platform 12, supporting pump 101, injection or suction fluid passage member 107 connected to pump 101, discharge or suction tube connected to pump 101, riser pipe 105, buoyancy member 121, and ports 108.
Figure 2B:
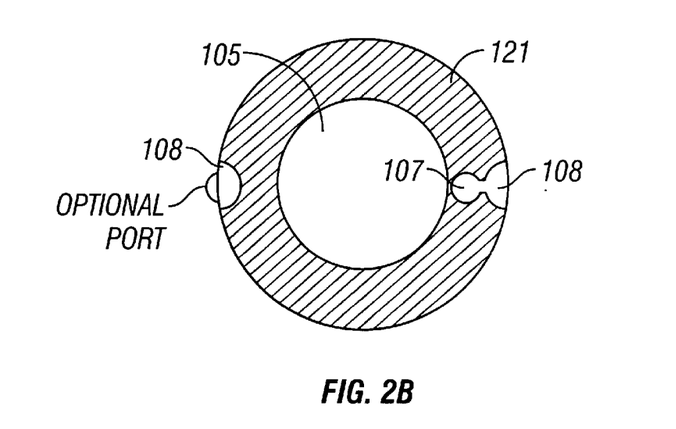
FIG. 2B is a cross-sectional view of riser pipe 105, buoyancy member 121, and injection/suction fluid passage members 107 having ports 108.

The present invention will now be described by reference to the figures. Referring now to FIG. 2A, there is shown a schematic of active apparatus of the present invention, showing deck 102 on platform 12, supporting pump 101, injection of suction fluid passage member 107 connected to pump 101, discharge or suction tube connected to pump 101, riser pipe 105, buoyancy member 121, and ports 108. Referring now to FIG. 2B, there is shown a cross-sectional view of riser pipe 105, buoyancy member 121, and injection/suction fluid passage members 107 having ports 108.

In operation, pump 101 may be operated to either provide injection through ports 108 into the regions around riser member 105, or to provide section through ports 108 from regions around riser member 105.

Figure 3:
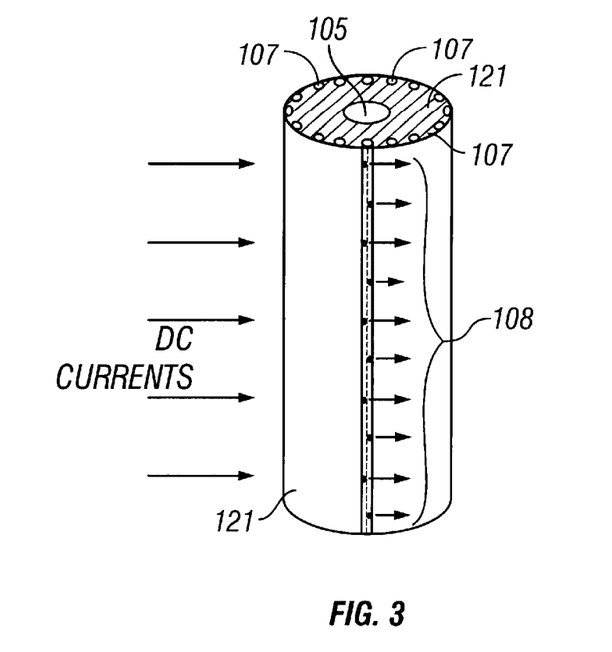
FIG. 3 is an illustration of one vertical arrangement embodiment showing riser pipe 105 with buoyancy member 121, around which are positioned circumferentially a plurality of injection/suction fluid passage members 107 having ports 108.

Referring now to FIG. 3, there is shown one vertical arrangement embodiment showing riser pipe 105 with buoyancy member 121, around which are positioned circumferentially a plurality of injection/suction fluid passage members 107 having ports 108. This arrangement will allow one to select the desired or optimal passages 107 to either inject into or draw suction from, to achieve the desired protection from currents flowing in direction $D_c$. This selection may be made manually, or may be by automatic control which monitors current direction and flow $D_c$, and accordingly through valving and tubing connects pump 101 to the necessary passages 107.

Figure 4:
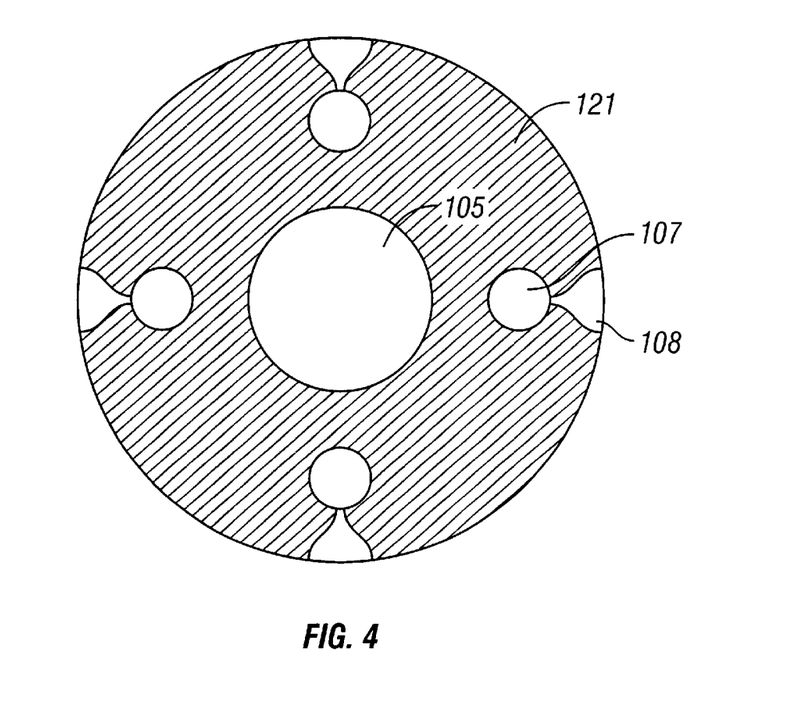
FIG. 4 is a cross-sectional view of riser pipe 105 showing buoyancy member 121, injection/suction fluid passage members 107, and ports 108.

FIG. 4 is a cross-sectional view of riser pipe 105 showing buoyancy member 108, injection/suction fluid passage members 107, and ports 108.

Figure 5:
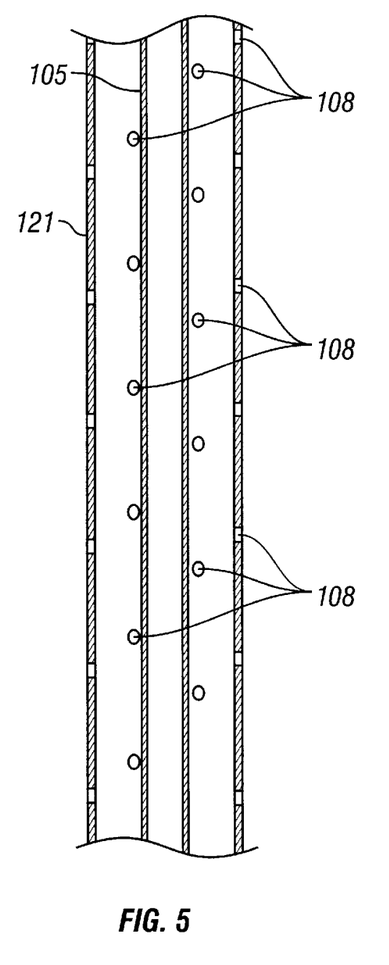
FIGS. 5 and 6 are side views of riser pipe 105 and buoyancy member 121, showing respectively a helical arrangement of ports 108, and an axial arrangement of ports 108.
Figure 6:
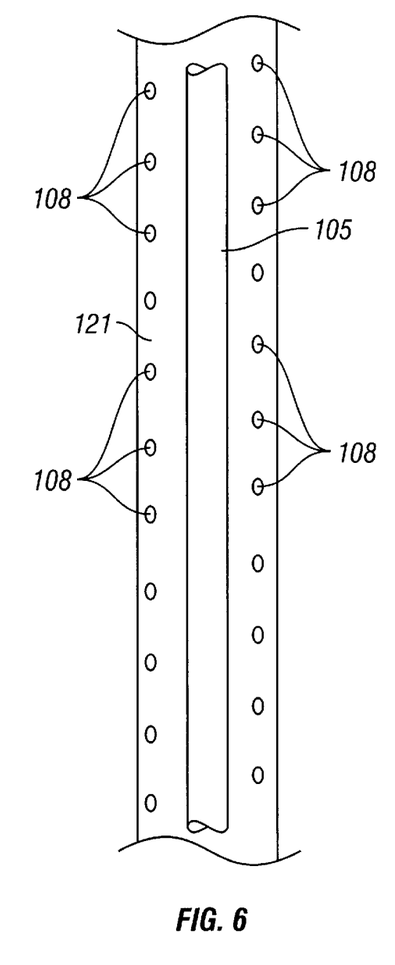

FIGS. 5 and 6 are side views of riser pipe 105 and buoyancy member 121, showing respectively a helical arrangement of ports 108, and an axial arrangement of ports 108. It should be understood that any desired arrangement of ports 108 may be utilized to reduce fluid drag and reduce vibration.

Figure 7:
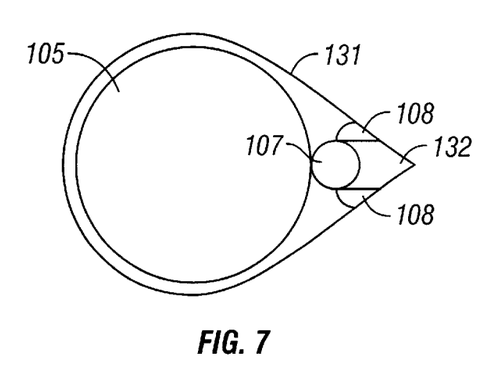
FIG. 7 is a cross section showing a fairing 131, positioned around riser pipe 105, with injection/suction fluid passage members 107 and ports 108 incorporated into fairing tail 132.

The present invention may be utilized in conjunction with or incorporated into other VIV devices, non-limiting examples of which include strakes, fairings, wake splitters, flat plates and the like. For example, referring now to FIG. 7, there is shown a fairing 131, position around riser pipe 105, with injection/suction fluid passage members and ports 108 incorporated into fairing tail 132.

Ports 108 may be any suitable cross-sectional shape, including that of any regular or irregular polygon, and including that formed by any curvilinear shape. Non-limiting examples of suitable cross-sectional shapes for port 108 include triangular, square, pentagonal, hexagonal, octagonal, circular, oval, and the like. The only limitations on the cross-sectional shape is that they provide a suitable flow and not unduly add to flow drag or vibration, and optionally provide some reduction in the flow drag or vibration.

While injection/suction fluid passage member 107 has been illustrated as being within and integral to buoyancy member 121, it should be understood that fluid passage 107 may also be placed on the outside of and distinct from buoyancy member 121.

While the present invention has been illustrated mainly by reference to a riser for a TLP, it should be understood that the present invention is not to be so limited and finds utility in a wide variety of applications, including but not limited to ship hulls, risers and columns of semi-submersibles, spars, and FPSO, and the like.

Figure 8:
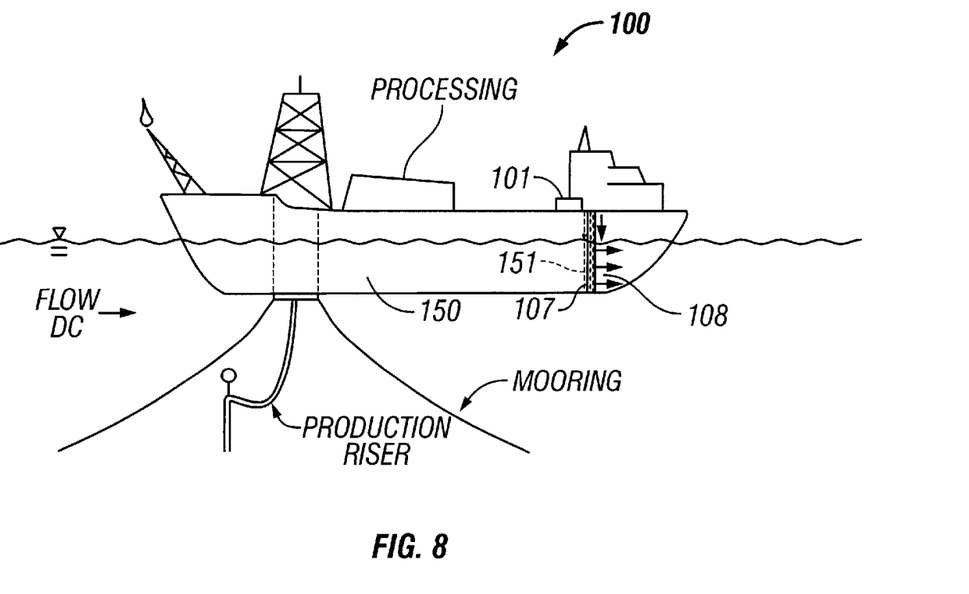
FIG. 8 is a drawing showing another embodiment of active apparatus 100 on a ship or other moored vessel 150, and pump 101, injection/suction passage 107 having ports 108 positioned along and supported by hull 151.

For example, referring now to FIG. 8, there is shown another embodiment of active apparatus 100 on a ship or other moored vessel 150, and pump 101, injection/suction passage 107 having ports 108 positioned along and supported by hull 151. Apparatus 100 can be operated to reduce current drag and vibrations. Although FIG. 8 shows passage 107 being positioned along and supported buy hull 151, it should be noted that passages 107 may also pass thru the vessel 150.

Figure 9:
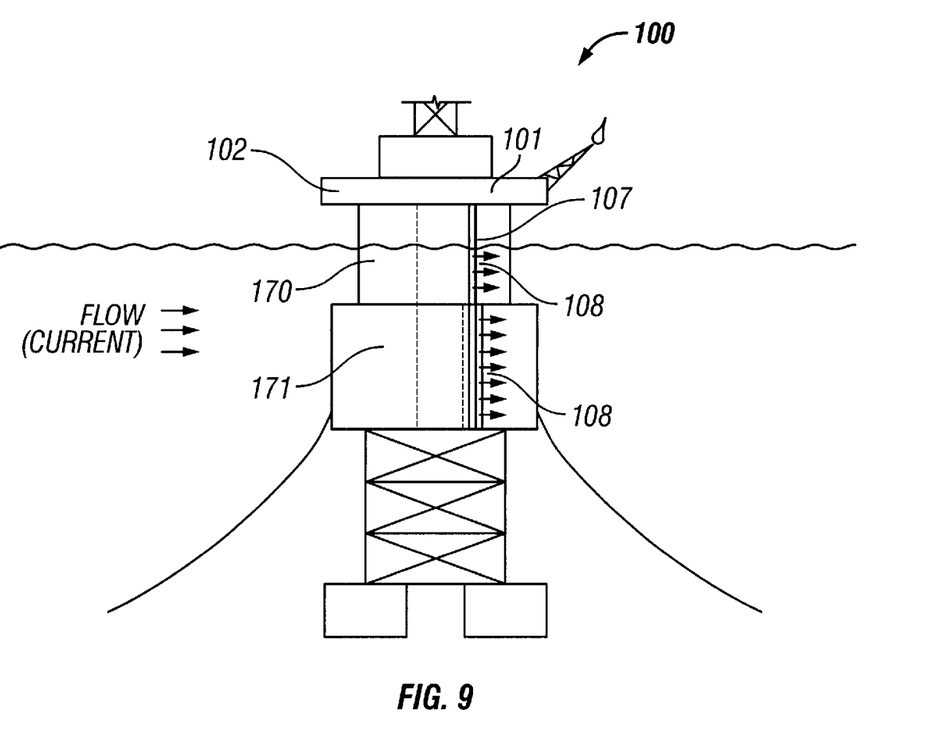
FIG. 9 is a drawing showing another embodiment of active apparatus 100 on a spar 170, and pump 101, injection/suction fluid passage members 107 having ports 108 positioned along spar section 171.

As another example, referring now to FIG. 9, there is shown another embodiment of active apparatus 100 on a spar 170, and pump 101, injection/suction fluid passage members 107 having ports 108 positioned along spar section 171. Apparatus 100 can be operated to reduce current drag and vibrations.

Figure 10A:
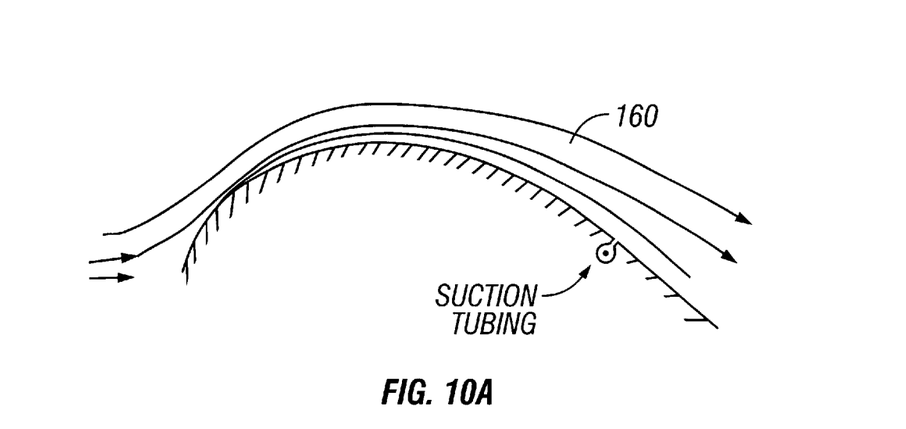
FIGS. 10A–C are drawings showing in FIG. 10A the position of suction passages relative to flow 160, in FIG. 10B a boundary region before suction; and in FIG. 10C a boundary region after suction.
Figure 10B:
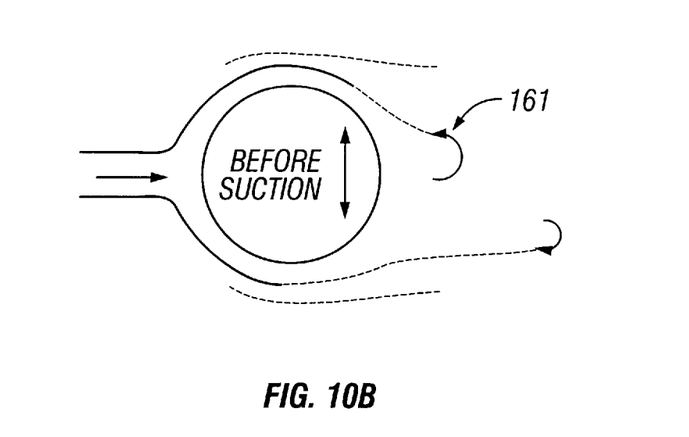
Figure 10C:
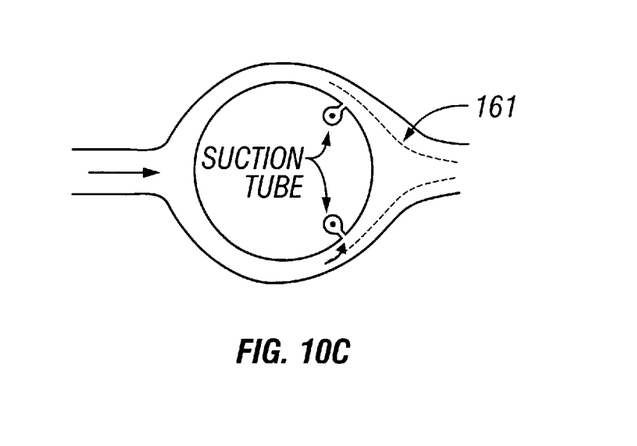

Apparatus 100 can also be operated to draw suction from the boundary region. Referring now to FIGS. 10A–C there is shown (A) position of suction passages relative to flow 160, (B) boundary region before suction; and (C) boundary region after suction.

Furthermore, while the present invention has been illustrated mainly by reference to a marine environment, non-limiting examples of which include fresh and saltwater and flowing and non-flowing bodies of water such as oceans, seas, gulfs, rivers, lakes, lochs, streams, ponds, or estuaries.

It should be understood that the present invention is not to be so limited and finds utility in a wide variety of other environments, including air and other gases.

Regarding materials of construction, injection/suction fluid passage members 107 may be constructed of any materials suitable for the underwater environment and suitable for supporting the strakes. Additionally, it may be desirable in some instances for fluid passage members 107 to provide buoyancy and/or insulation.

Finally, the active apparatus and methods of the present invention may be utilized in any combination with the passive methods and apparatus as disclosed in Provisional Patent Application entitled "Passive Apparatus and Method for Reducing Fluid Induced Stresses by Introduction of Energetic Flow into Boundary Layer Around Offshore Platform Riser", by inventors Hongbo Xu and Donald Wayne Allen, filed on Jan. 31, 2000 as Ser. No. 60/179,223, and as disclosed in U.S. Patent application entitled, "Passive Apparatus and Method for Reducing Fluid Induced Stresses by Introduction of Energetic Flow into Boundary layers Around Marine Structures" by inventors, Hongbo Shu and Donald Wayne Allen, further identified by attorney docket No. 26780/05, filed on even date herewith under Express Mail No.EL 855 100 844US, both of which application are herein incorporated by reference.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A method for protecting a first member from the effects of a fluid current flowing past the first member, the current defining a fluid boundary layer near the member, the method comprising:
   (a) pumping fluid thru a plurality of fluid passages of a fluid passage member, wherein said fluid passage member comprises a boundary layer surface of the first member, wherein each of said plurality of fluid passages comprises a plurality of ports located along at least a portion of said boundary layer surface, wherein said fluid is pumped out of said fluid passages and into said fluid boundary layer through said ports, and wherein said ports are arranged in a helical fashion on the surface of said fluid passage member.

2. The method of claim 1, wherein the method further comprises:
   (b) selectively pumping fluid thru one or more of the plurality of fluid passages into the fluid boundary layer.

3. The method of claim 1 wherein said fluid passage member is supported by said first member.

4. A method for protecting a member from the effects of a fluid current flowing past said member, the current defining a fluid boundary layer near the member, the method comprising:
   (a) suctioning fluid from said fluid boundary layer thru a plurality of fluid passages of a fluid passage member, wherein said fluid passage member comprises a boundary layer surface of the member, wherein each of said plurality of fluid passages comprises a plurality of ports located alone at least a portion of said boundary layer surface, wherein said fluid is suctioned from said fluid boundary layer by said ports and passes through said fluid passages, and wherein said ports are arranged in a helical fashion on the surface of said fluid passage member.

5. The method of claim 4 wherein said fluid passage member is supported by said member.

6. A method for reducing low frequency oscillations of a moored vessel caused by waves or wind striking the vessel, wherein the vessel has a first side and a second side and a plurality of fluid passages extending from the first side to the second side, wherein each of said plurality of passages comprises a first opening positioned on the first side and a second opening positioned on the second side, wherein said first openings are arranged in a helical pattern and wherein said second openings are arranged in a helical pattern and wherein the oscillations of the vessel define an oscillating current of water flowing past the vessel the method comprising:
   (a) pumping water in from either opening when the vessel moves toward said current and out of either opening when the vessel moves away from said current.

7. The method of claim 5, wherein the fluid passages are provided thru the vessel.

8. The method of claim 5, wherein the fluid passage is defined by a fluid passage member which is supported by the vessel.

9. A system for reducing the effects of a fluid current flowing past a bluff hull wherein said current defines a fluid boundary layer near the hull, the system comprising:
   (a) a hull defining a fluid passage member having a boundary layer surface, wherein said fluid passage member comprises a plurality of fluid passages, wherein each of said plurality of fluid passages comprises a plurality of ports located along at least a portion of said boundary layer surface, wherein said fluid passes through said ports and into said fluid boundary layer, or out of said fluid boundary layer and through said ports, and wherein said ports are arranged in a helical fashion on the surface of said fluid passage member; and
   (b) a pump in communication with the plurality of fluid passages, wherein the pump functions to pass fluid through said fluid passages.

10. The system of claim 9 wherein said pump provides injection of fluid through said fluid passages, out of said ports, and into said fluid boundary layer.

11. The system of claim 9 wherein said pump provides suction of fluid from said fluid boundary layer, wherein said fluid is suctioned in through said ports and through said fluid passages.

* * * * *